(No Model.)
W. WEBSTER.
FEED WATER HEATER.
No. 390,537. Patented Oct. 2, 1888.
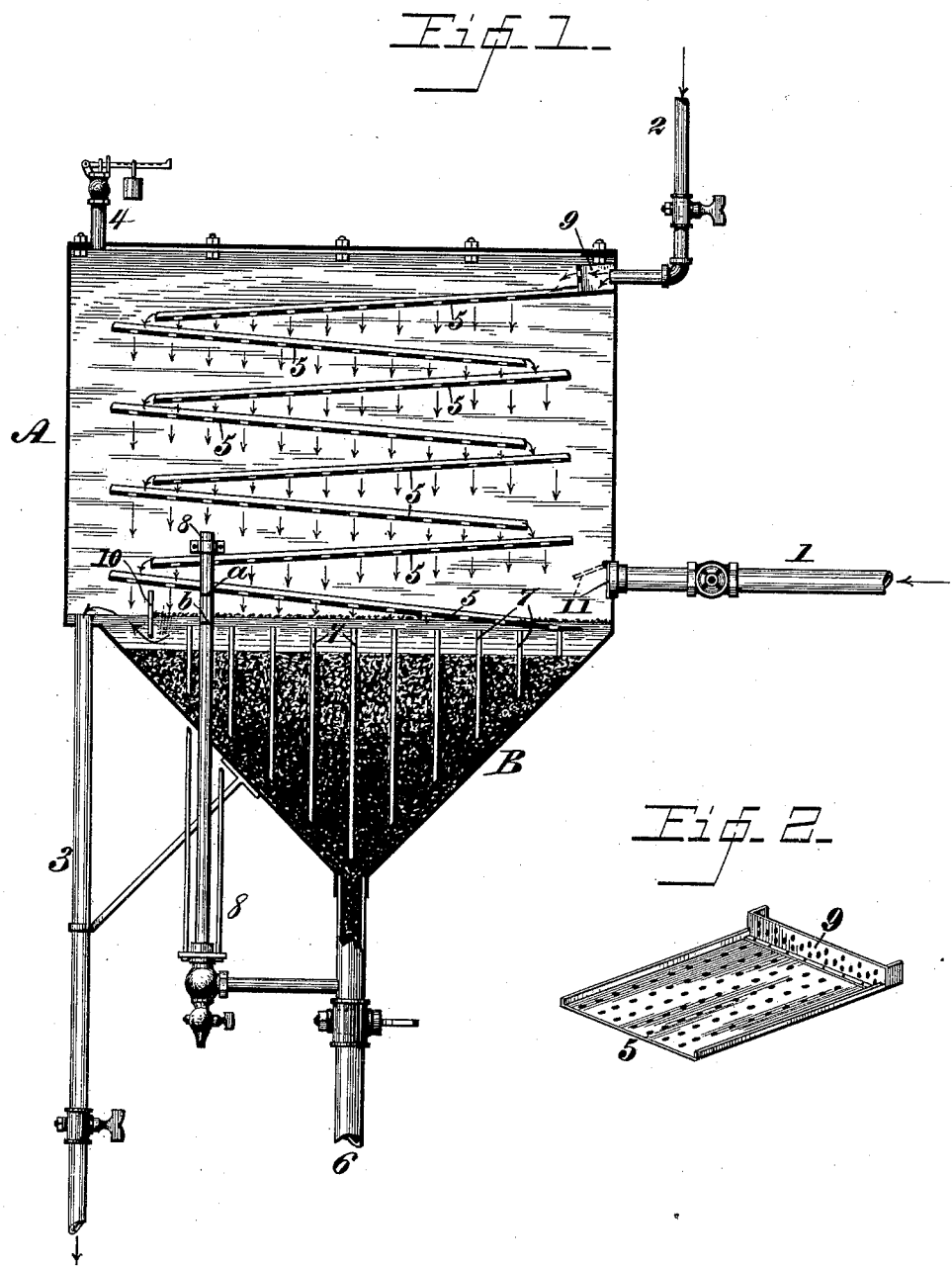

UNITED STATES PATENT OFFICE.

WARREN WEBSTER, OF PHILADELPHIA, PENNSYLVANIA.

FEED-WATER HEATER.

SPECIFICATION forming part of Letters Patent No. 390,537, dated October 2, 1888.

Application filed March 29, 1888. Serial No. 268,859. (No model.)

*To all whom it may concern:*

Be it known that I, WARREN WEBSTER, a citizen of the United States, residing in the city and county of Philadelphia, State of Pennsylvania, have invented a new and useful Improvement in Feed-Water Heaters, which improvement is fully set forth in the following specification and accompanying drawings.

My invention consists of a feed-water heater embodying a chamber provided with trays or plates adapted to allow water to flow over and spray through the same and be subjected to the action of steam, whereby vapor of low tension is produced, thus causing the deposition of impurities of said water and production of pure water, as will be hereinafter fully set forth.

It also consists of means for preventing agitation of the deposited impurities.

It further consists of other novel features, as will be hereinafter fully set forth and definitely claimed.

Figure 1 represents a partial side elevation and partial vertical section of a feed-water heater embodying my invention. Fig. 2 represents a perspective view of a detached portion thereof.

Similar letters of reference indicate corresponding parts in the two figures.

Referring to the drawings, A represents a vessel or chamber, with which is connected a steam-inlet pipe, 1, a water induction or supply pipe, 2, a water-eduction pipe, 3, and a safety-valve, 4. Within the chamber are secured the perforated trays or plates 5, which are located one below the other from the top to the bottom of the chamber, and alternately inclined and communicating at adjacent ends, so as to form a zigzag chute or passage. The plates 5 are not in contact at their ends with the wall of the chamber A; but there is an open passage-way at said ends, whereby the steam from the steam-inlet pipe has free communication to both sides of all the plates.

At the bottom of the chamber A, and communicating therewith, is a mud-well or sediment-chamber, B, which has an outlet-pipe, 6, the several pipes enumerated having suitable cocks or valves, for evident purposes.

Within the chamber B are secured vertical plates 7, which are separated from each other and from the bottom of said chamber B. Connected with the pipe 6 is the branch pipe of a gage, 8, which is located outside of the chamber A, and has indicating-marks $a$ $b$ thereon relatively to the greatest height that the mud or sediment and water should be permitted to attain in the chambers A B, respectively, it being noticed that the mark $a$ is at or about the level of the lower side of the pipe 1 and the mark $b$ at or about the level of the top of the plates 7. The pipe 1 leads into the chamber A near the bottom thereof and the pipe 2 at the upper end thereof.

Within the chamber A, near the top thereof, is a perforated plate, 9, which is located adjacent to the end of the pipe 2 and at the beginning of the upper plate, 5.

Connected with the mud-well or sediment-chamber is a deflector, 10, which rises above the plates 7, for purposes to be hereinafter explained.

The operation is as follows: Water and steam are admitted into the chamber A by means of the pipes 2 1, respectively. The water, after leaving the pipe 2, strikes the plate 9 and passes through the same, so as to be distributed over the top plate, 5. The water flows in part down said plate and escapes in part through the perforations thereof in the form of spray or drops. The water then flows over and through the next tray in a manner similar to that stated, and so continues throughout the series of trays. The water is subjected to the action of the steam and the latent heat of the trays, whereby it is converted into vapor of low tension, the effect of which is the disintegration of the vaporized water and the liberation of the impurities therein, said impurities dropping into the well B and settling therein. The pure water rises above the impurities and is directed into the pipe 3, whereby it may be directed to the place of collection, or pumped or otherwise returned into the boiler or returned elsewhere, as desired. Owing to the plates 7 within the well or chamber B, the agitation or ebullition of the mud or sediment therein is prevented and the settling of the same is facilitated, the purity of the water being also preserved. It will be seen that as the water flows down the trays and drops through the same it is distributed in the form of a shower and vaporized. Consequently all of the animal or mineral matter contained in the water admitted by pipe 2 will be removed and washed down the surfaces of the trays into the well or sediment-chamber, and the vapor of low tension thus formed will again be converted into liquid as it comes in contact with the sides of the chamber A. Owing to the arrangement of the trays the water is subjected to the action of the steam both above and below the plates, and the steam entirely surrounds the trays. The water is also caused to travel over the several surfaces of the series of trays sufficiently to cause its evaporation by absorbing the latent heat of said trays should the openings or perforations thereof clog with animal or mineral matter.

The amount of water and steam admitted into the chamber A should be regulated or adjusted by the valves or cocks thereof. The purified water should not rise above the level of the under side of the interior of the pipe 1, so as to avoid interfering with the proper admission of steam into the chamber A, and the mud or sediment should not rise above the tops of the plates 7, and thus escape into the eduction-pipe 3. To this end the gage 8 has to be watched. In the event of excessive pressure of steam in the chamber A the valve 4 opens, and thus relieves said pressure.

The pipe 1 is provided with a check-valve, 11, which closes outwardly, so as to prevent the return of steam or backing of water in the said pipe 1.

Where exhaust-steam is used, the oil floating upon the water rises above the plates 7, and is prevented from overflowing and escaping with the pure water, owing to the deflector 10, which rises considerably above the plates 7, the purified water, however, flowing under said deflector, and so reaching the eduction or discharge pipe 3.

The safety-valve 4 is employed when live steam is used. When exhaust-steam is used, a vacuum-valve is substituted for said safety-valve.

The plates 5 and 7 may be removably secured in position, so that they may be displaced for purposes of cleansing and repairs.

The lower end of the deflector 10 extends below the level of the outlet-pipe 3 and dips into the water at all times, so that any oil that may accumulate on the water is prevented from reaching the pipe 3.

The oil collected may be removed by closing the valve of pipe 3 and opening that of pipe 6, the oil then running off with the sediment.

Having thus described my invention, what I claim as new, and desire to secure by Letters Patent, is—

1. A feed-water heater having a perforated tray therein, and a water-distributer, such as 9, between said tray and the water-supply pipe, substantially as described.

2. A feed-water heater having a vaporizing-chamber, a water-supply pipe, a steam-supply pipe with a check-valve, a chamber for purified water and sediment, discharge-pipes for the purified water and sediment, and a relief-valve, substantially as and for the purpose described.

3. A feed-water heater having a vaporizing-chamber, a water-supply pipe, a steam-supply pipe with a check-valve, a chamber for purified water and sediment, and discharge-pipes for the purified water and sediment, substantially as and for the purpose described.

4. A feed-water heater having a steam-chamber with a sediment-chamber below the same, a water-inlet pipe at top of said steam-chamber and a steam-inlet pipe at the side thereof, and inclined perforated plates in said steam-chamber, with a passage-way between the same and the walls of the chamber, said parts combined substantially as and for the purpose set forth.

5. The chamber A, with a sediment-chamber below the same, water-inlet 1 at top of said chamber A and steam-inlet pipe at side of said chamber, vertical plates 7 in said sediment-chamber, and inclined perforated plates 5 in said steam-chamber, the deflector 10, having its upper edge above the level of the top of plates 7 and its lower edge below the same, and the discharge water-pipe 3, said parts combined substantially as and for the purpose set forth.

WARREN WEBSTER.

Witnesses:
JOHN A. WIEDERSHEIM,
WM. N. MOORE.